United States Patent
Morioka (10) Patent No.: US 10,439,178 B2
(45) Date of Patent: Oct. 8, 2019

(54) IN-VEHICLE BATTERY MODULE

(71) Applicant: TOYOTA JIDOSHA KABUSHIKI KAISHA, Toyota-shi, Aichi-ken (JP)

(72) Inventor: Satoshi Morioka, Okazaki (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 22 days.

(21) Appl. No.: 15/601,268

(22) Filed: May 22, 2017

(65) Prior Publication Data

US 2017/0346050 A1 Nov. 30, 2017

(30) Foreign Application Priority Data

May 24, 2016 (JP) ................................ 2016-103344

(51) Int. Cl.
| | |
|---|---|
| *H01M 2/10* | (2006.01) |
| *H01M 2/02* | (2006.01) |
| *H01M 2/12* | (2006.01) |
| *H01M 2/20* | (2006.01) |

(Continued)

(52) U.S. Cl.
CPC ........... *H01M 2/105* (2013.01); *H01M 2/025* (2013.01); *H01M 2/1077* (2013.01); *H01M 2/1083* (2013.01); *H01M 2/1094* (2013.01); *H01M 2/1205* (2013.01); *H01M 2/1217* (2013.01); *H01M 2/1241* (2013.01); *H01M 2/206* (2013.01); *H01M 10/0422* (2013.01);
(Continued)

(58) Field of Classification Search
CPC .... H01M 2/10; H01M 2/1016–2/1083; H01M 2/20–24; H01M 10/42; H01M 10/425–4257; H01M 10/60–627; H01M 10/64–643; H01M 10/65; H01M 10/655–6561
See application file for complete search history.

(56) References Cited

U.S. PATENT DOCUMENTS

| | | | |
|---|---|---|---|
| 6,379,837 B1* | 4/2002 | Takahashi | H01M 2/08 429/120 |
| 2005/0079408 A1* | 4/2005 | Hirano | B60L 11/1874 429/82 |
| 2010/0116570 A1 | 5/2010 | Sugawara et al. | |

(Continued)

FOREIGN PATENT DOCUMENTS

| | | |
|---|---|---|
| EP | 2 575 194 A1 | 4/2013 |
| JP | 2010-113999 A | 5/2010 |

(Continued)

*Primary Examiner* — Jonathan G Leong
*Assistant Examiner* — Jacob Buchanan
(74) *Attorney, Agent, or Firm* — Sughrue Mion, PLLC (57) ABSTRACT

An in-vehicle battery module includes a plurality of cylindrical battery cells, a battery cell holder, a protective case, a vent cover provided such that the battery cell holder is positioned between the protective case and the vent cover, the vent cover and the battery cell holder disposed such that a vent space in which gas discharged from an end face on a second-electrode side of the cylindrical battery cell flows is provided between the vent cover and the battery cell holder, at least one first-electrode bus bar, at least one second-electrode bus bar provided in the vent space, and a support member disposed partially in the vent space and the support member being configured to support the second-electrode bus bar from the vent cover side.

5 Claims, 7 Drawing Sheets (51) Int. Cl.
*H01M 10/04* (2006.01)
*H01M 10/52* (2006.01)

(52) U.S. Cl.
CPC ........ *H01M 10/0486* (2013.01); *H01M 10/52* (2013.01); *H01M 2220/20* (2013.01)

(56) References Cited

U.S. PATENT DOCUMENTS

| | | | | |
|---|---|---|---|---|
| 2011/0135975 | A1* | 6/2011 | Fuhr | H01M 2/08 |
| | | | | 429/53 |
| 2013/0082659 | A1* | 4/2013 | Kano | H01M 2/105 |
| | | | | 320/128 |
| 2014/0302377 | A1* | 10/2014 | Naito | H01M 2/105 |
| | | | | 429/156 |
| 2015/0140369 | A1 | 5/2015 | Itoi et al. | |
| 2015/0255225 | A1* | 9/2015 | Kusaba | H01M 10/625 |
| | | | | 429/120 |
| 2015/0380713 | A1* | 12/2015 | Kimura | H01G 11/10 |
| | | | | 429/121 |
| 2016/0141573 | A1 | 5/2016 | Aoki et al. | |

FOREIGN PATENT DOCUMENTS

| | | | | |
|---|---|---|---|---|
| JP | 2016134232 | A | 7/2016 | |
| RU | 828913 | C | 3/1995 | |
| WO | 2008/086212 | A1 | 7/2008 | |
| WO | 2013/002659 | A1 | 1/2013 | |
| WO | WO-2014083600 | A1 * | 6/2014 | ......... H01M 10/625 |
| WO | WO-2014122893 | A1 * | 8/2014 | ............. H01G 11/10 |

\* cited by examiner

IN-VEHICLE BATTERY MODULE

INCORPORATION BY REFERENCE

The disclosure of Japanese Patent Application No. 2016-103344 filed on May 24, 2016 including the specification, drawings and abstract is incorporated herein by reference in its entirety.

BACKGROUND

1. Technical Field

The disclosure relates to an in-vehicle battery module that includes a plurality of cylindrical battery cells and is installed in a vehicle.

2. Description of Related Art

Conventionally, there is known a battery module that includes a plurality of cylindrical battery cells and is installed in a vehicle. For example, Japanese Patent Application Publication No. 2010-113999 (JP 2010-113999 A) discloses a battery module including a plurality of cylindrical battery cells. In JP 2010-113999 A, a pair of side plates are disposed on both axial sides of the cylindrical battery cells and hold the cylindrical battery cells therebetween. Bus bars electrically connecting the cylindrical battery cells are embedded in the side plates. On the sides, opposite to the cylindrical battery cells, of the side plates, cover members covering the side plates are disposed such that flow paths for fluid to flow through are formed between the cover members and the side plates.

SUMMARY

As described above, the conventional battery module disclosed in JP 2010-113999 A has the structure for holding the cylindrical battery cells. However, in the conventional battery module, there is no sufficient consideration about a structure for maintaining the performance of the battery module even when the members holding the cylindrical battery cells are partially damaged or degraded.

For example, in the battery module of JP 2010-113999 A, while the cylindrical battery cells are held between the pair of side plates, if either one of the side plates is damaged or bent, the cylindrical battery cells move in the axial direction, so that it is not possible to ensure the electrical connection. In other words, in the conventional battery module, there is a problem that the electrical performance is impaired even only with damage to one component, resulting in poor reliability as a battery module. In particular, such a problem tends to arise in an in-vehicle battery module that is subjected to various vibrations during travel of a vehicle.

Therefore, the disclosure provides an in-vehicle battery module that can further improve the reliability.

An in-vehicle battery module according to the disclosure includes: a plurality of cylindrical battery cells each of the plurality of cylindrical battery cells including a first electrode and a second electrode at both axial ends of the cylindrical battery; a battery cell holder configured to hold the plurality of cylindrical battery cells in a state where the first electrodes and the second electrodes are exposed to outside; a protective case configured to urge end faces on first-electrode sides of the plurality of cylindrical battery cells toward second-electrode sides of the plurality of cylindrical battery cells; a vent cover provided such that the battery cell holder is positioned between the protective case and the vent cover, the vent cover and the battery cell holder disposed such that a vent space in which gas discharged from an end face on the second-electrode side of the cylindrical battery cell flows is provided between the vent cover and the battery cell holder; at least one first-electrode bus bar being in contact with the first electrodes of the plurality of cylindrical battery cells such that at least two of the cylindrical battery cells are connected in parallel to each other; at least one second-electrode bus bar provided in the vent space and the at least one second-electrode bus bar being in contact with the second electrodes of the plurality of cylindrical battery cells such that at least two of the cylindrical battery cells are connected in parallel to each other; and a support member disposed partially in the vent space and the support member being configured to support the second-electrode bus bar from the vent cover side.

In this case, the cylindrical battery cells are held between the protective case and the second-electrode bus bar, and further, the second-electrode bus bar is supported by the support member. Therefore, even when an adhesive or the like fixing the cylindrical battery cells to the battery cell holder is damaged, the movement of the cylindrical battery cells in the axial direction is restricted, so that the electrically connected state of the cylindrical battery cells is maintained. In other words, since the performance of the battery module is maintained even when one component (adhesive) is damaged, it is possible to improve the reliability of the battery module.

The in-vehicle battery module may include an elastic member disposed at least one of between the end faces on the first-electrode sides of the cylindrical battery cells and the protective case and between the end faces on the second-electrode sides of the cylindrical battery cells and the second-electrode bus bar such that the elastic member elastically deforms to absorb an axial height tolerance of the cylindrical battery cells.

In this case, since the axial height tolerance of the cylindrical battery cells is absorbed, the cylindrical battery cells are held more reliably between the protective case and the second-electrode bus bar, so that the movement of the cylindrical battery cells in the axial direction is prevented more reliably.

The first-electrode bus bar may be joined to the battery cell holder via the protective case, and the second-electrode bus bar may be joined to the battery cell holder via the vent cover.

In this case, since the first-electrode bus bar and the second-electrode bus bar move in the same phase, the load applied to conducting portions of the bus bars to the cylindrical battery cells during vibration can be reduced.

The support member may include a plurality of columnar portions disposed, at an interval, between the vent cover and the second-electrode bus bar.

In this case, support points of the second-electrode bus bar by the columnar portions can be uniformly distributed without impairing the flow of gas, so that bending or the like of the second-electrode bus bar can be prevented more effectively.

Insulation treatment may be applied to a surface of the vent cover, a part of the vent cover subjected to the insulation treatment may include a protruding portion that protrudes toward the second-electrode bus bar and supports the second-electrode bus bar, and the protruding portion may function as the support member.

In this case, since the vent cover is used both as the support member and the vent cover, it is possible to reduce the number of components.

As described above, according to the disclosure, since the performance of a battery module is maintained even when one component (adhesive) is damaged, it is possible to improve the reliability of the battery module.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
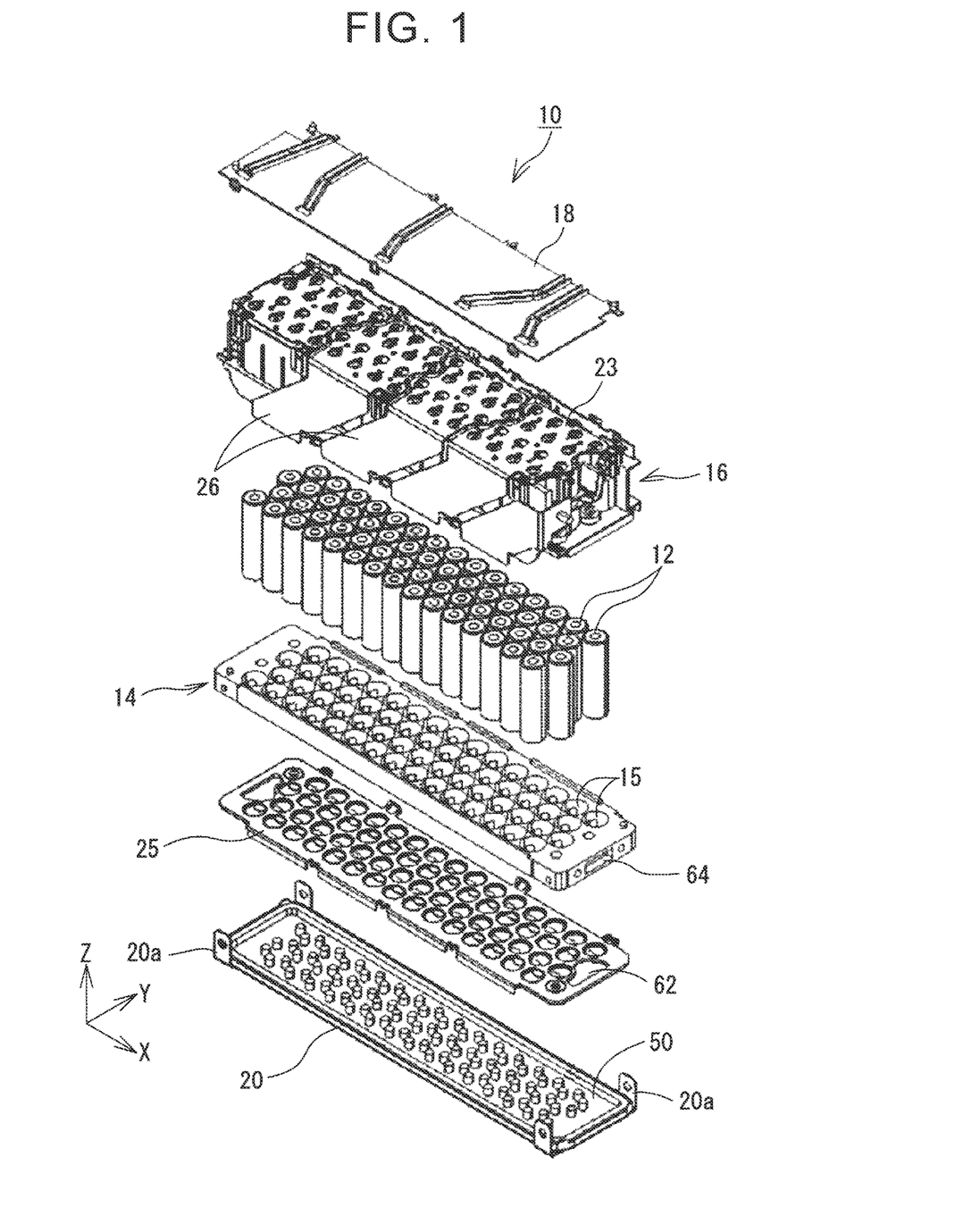
FIG. 1 is an exploded perspective view of a battery module according to an embodiment of the disclosure.
Figure 2:
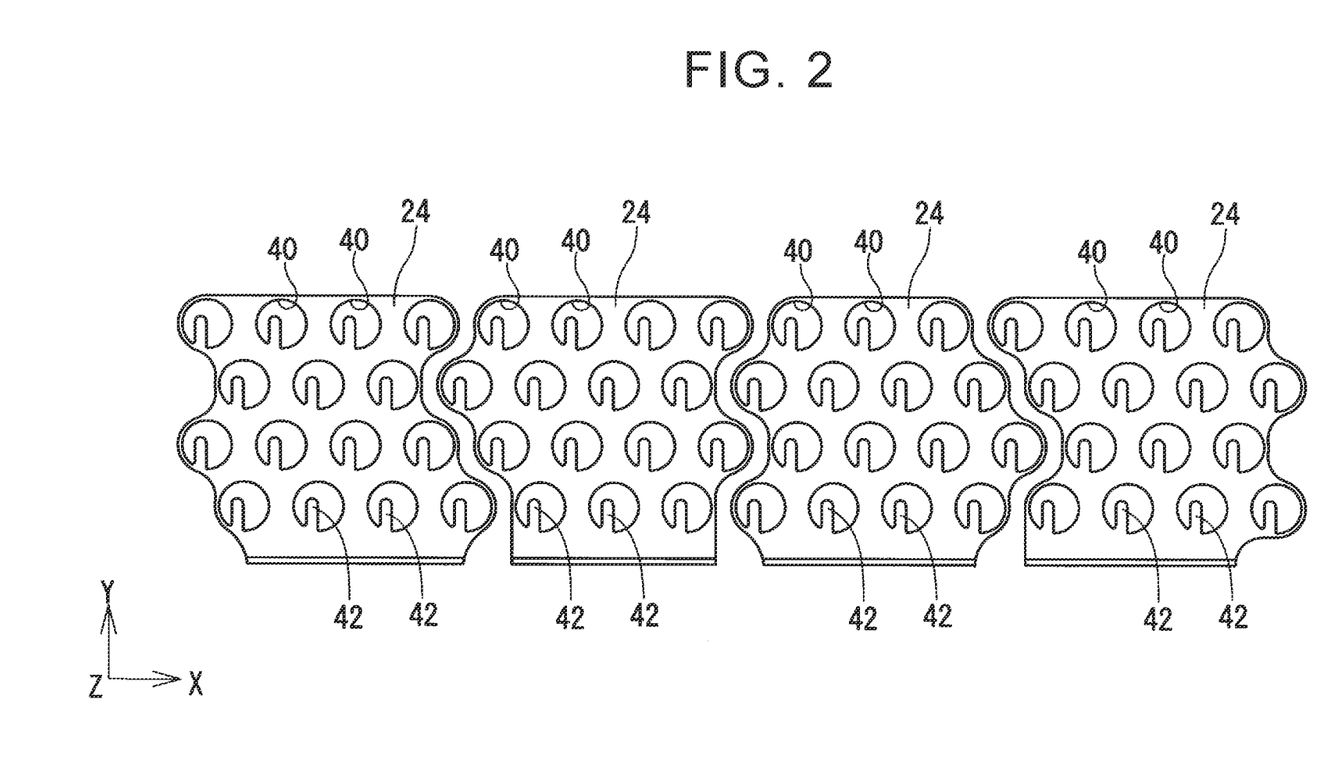
FIG. 2 is a plan view of conductive plates of a negative-electrode bus bar.
Figure 3:
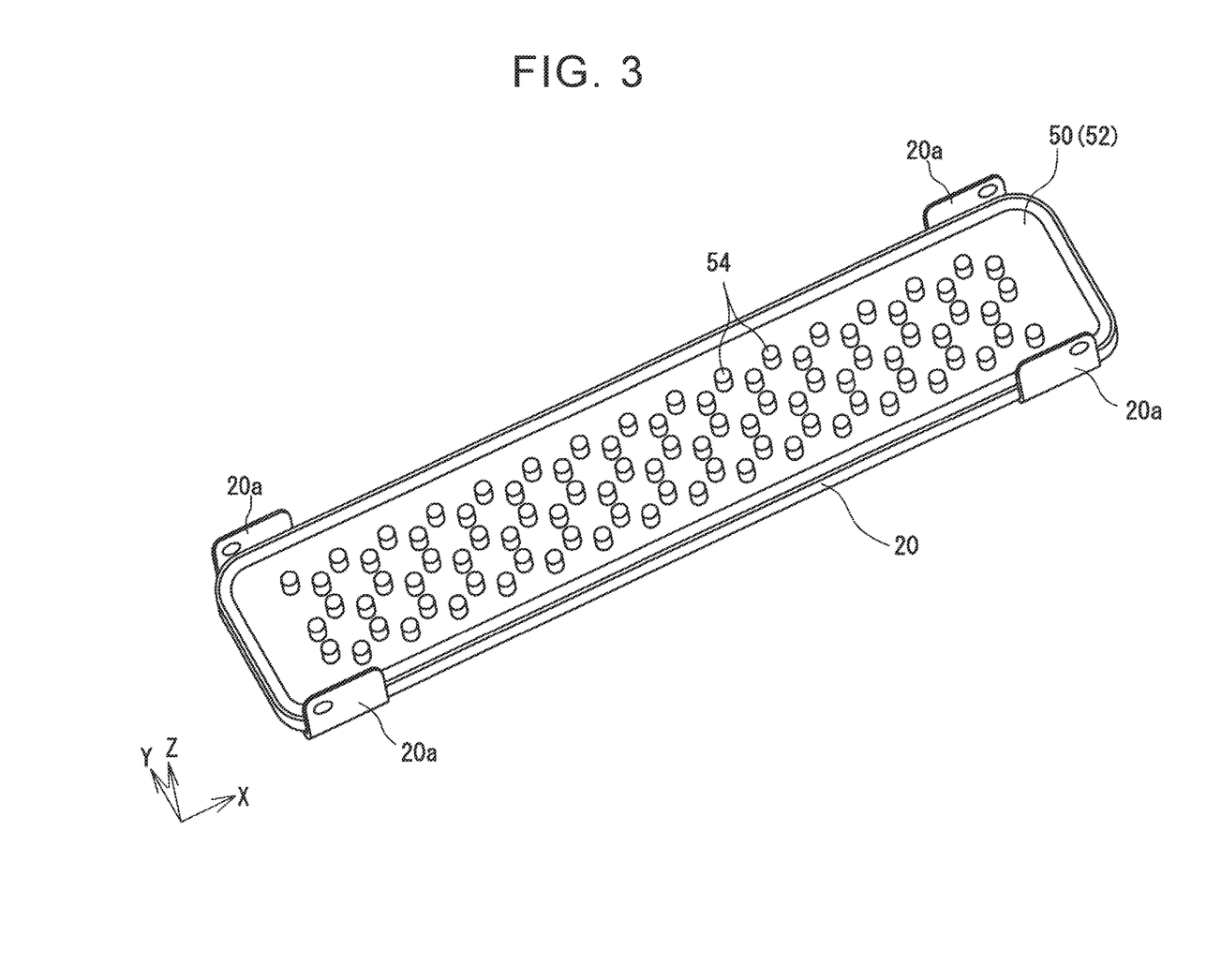
FIG. 3 is a perspective view of a vent cover integrated with a support member.
Figure 4:
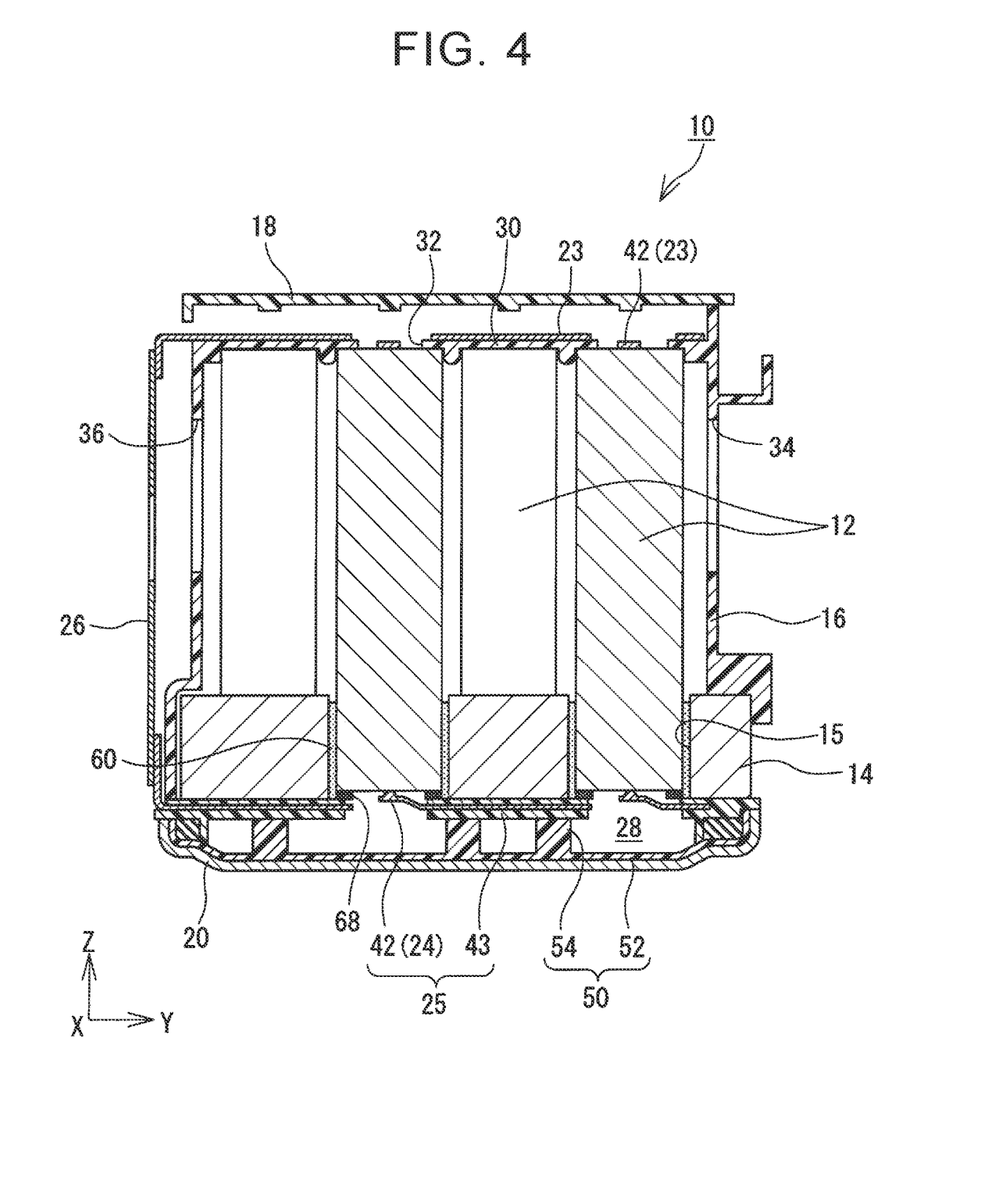
FIG. 4 is a sectional view of the battery module in the YZ plane.

Hereinbelow, a battery module 10 according to an embodiment of the disclosure will be described with reference to the drawings. FIG. 1 is an exploded perspective view of the battery module 10 according to the embodiment of the disclosure. FIG. 2 is a plan view of conductive plates 24 of a negative-electrode bus bar 25, FIG. 3 is a perspective view of a vent cover 20 that is integrated with a support member 50, and FIG. 4 is a sectional view of the battery module 10 in the YZ plane. In the following description, a longitudinal direction of the battery module 10 will be referred to as an "X direction", an axial direction of a battery cell 12 as a "Z direction", and a direction perpendicular to the X direction and the Z direction as a "Y direction".

The battery module 10 includes a plurality of cylindrical battery cells 12. The battery cell 12 is a chargeable and dischargeable secondary battery cell and may be, for example, a nickel-hydrogen battery cell or a lithium-ion battery cell that is housed in a cylindrical case. The battery cell 12 is provided at its both axial ends with a positive electrode (first electrode) and a negative electrode (second electrode) serving as electrodes of the battery cell 12. The battery module 10 shown in FIG. 1 includes 60 battery cells 12, and these 60 battery cells 12 are arranged in an array of 4 rows and 15 columns. The 60 battery cells 12 are grouped per 15 battery cells to form four battery cell groups. The 15 battery cells 12 belonging to the same battery cell groups are connected in parallel to each other by the negative-electrode bus bar 25 and a positive-electrode bus bar 23 which will be described later. The battery cell groups each including the 15 battery cells 12 connected in parallel to each other are connected in series to the other battery cell groups or external output terminals by later-described inter-group bus bars 26.

The battery cell 12 is provided at its end face on the negative-electrode side with a discharge valve (not shown) that allows the discharge of gas generated in the battery cell 12. As long as the discharge valve can be opened when the internal pressure of the battery cell 12 is raised, its configuration is not particularly limited. The discharge valve can be formed, for example, by partially thinning an exterior case of the battery cell 12. When gas is generated in the battery cell 12 due to over-charge, over-discharge, short circuit, or the like to raise the internal pressure of the battery cell 12, the discharge valve (thinned portion) is broken, so that the gas is discharged to the outside of the battery cell 12.

The battery cells 12 are held upright with the directions of the positive electrodes and the negative electrodes aligned. In this embodiment, the battery cells 12 are held in an upright posture in which their end faces with the negative electrodes face downward (the vent cover 20 side). The battery cells 12 are held by a battery cell holder 14 with their lower end portions received in receiving holes 15 that are provided in the battery cell holder 14. The battery cell holder 14 is generally plate-shaped, and the receiving holes 15 are arranged two-dimensionally in the plate plane. In this embodiment, the receiving holes 15 are arranged in an array of 4 rows and 15 columns, and the receiving holes 15 in the adjacent rows are offset by a half pitch.

The receiving hole 15 has a round hole shape that is fitted to the cylindrical shape of the battery cell 12. The battery cell 12 is inserted into the round hole 15 and fixed thereto with an adhesive 60 (see FIG. 4). The length in a central axis direction of the receiving hole 15 is set long enough to prevent the held battery cell 12 from wobbling. The receiving hole 15 penetrates the battery cell holder 14 in its thickness direction, so that the lower end of the battery cell 12 is exposed downward. In order to uniformly disperse the generated heat to reduce temperature variation among the battery cells 12, the battery cell holder 14 is made of a high heat transfer material such as aluminum.

The battery cells 12 held by the battery cell holder 14 are covered therearound with a protective case 16. The protective case 16 is made of an insulating resin and is generally box-shaped with its bottom portion completely open. The lower end of the protective case 16 is joined to the peripheral edge of the battery cell holder 14. This joining manner is not particularly limited as long as the protective case 16 can move together with the battery cell holder 14 when the battery module 10 is subjected to vibration or the like. Therefore, the protective case 16 is joined to the battery cell holder 14, for example, by fitting, screwing, or welding. As will be described later, the positive-electrode bus bar 23 (first-electrode bus bar) is integrated with the protective case 16. Therefore, it can be said that the positive-electrode bus bar 23 is joined to the battery cell holder 14 via the protective case 16.

The protective case 16 has a ceiling plate 30 (see FIG. 4) that is provided near its upper end and that presses end faces on the positive-electrode sides of the battery cells 12 toward the negative-electrode sides. The ceiling plate 30 is provided with holding openings 32 having a diameter smaller than an outer diameter of the battery cells 12. While the positive electrodes of the battery cells 12 are exposed to the outside via the holding openings 32, the end faces of the battery cells 12 are pressed toward the negative-electrode sides by the peripheral edges of the holding openings 32. The positive-electrode bus bar 23 is fixed to an upper surface of the ceiling plate 30. Further, various wires (e.g. voltage detection wires and temperature detection wires) are wired above the protective case 16, and these wires are covered with an insulating cover 18.

Inlet openings 34 (see FIG. 4) and outlet openings 36 (see FIG. 4) are formed in a peripheral surface of the protective case 16. The inlet openings 34 are openings for introducing into the battery module 10 cooling air that cools the battery cells 12. The outlet openings 36 are openings for discharging to the outside the cooling air introduced into the battery module 10. The outlet openings 36 are provided in a side wall of the protective case 16 on the side opposite to the inlet openings 34 such that the battery cells 12 are interposed between the inlet openings 34 and the outlet openings 36. The inlet openings 34 and the outlet openings 36 are slit holes provided in the side walls of the protective case 16. These slit holes are each elongated in the height direction (Z direction) and are arranged at intervals in the longitudinal direction (X direction).

The vent cover 20 is disposed below the battery cell holder 14. The vent cover 20 has a generally boat shape with its peripheral edge raised upward. The peripheral edge of the vent cover 20 adheres to the peripheral edge of the battery cell holder 14 via the peripheral edge of the later-described support member 50, thereby forming a sealed space between the vent cover 20 and the battery cell holder 14. This sealed space serves as a space for disposing the later-described negative-electrode bus bar 25 (second-electrode bus bar) and also serves as a vent space 28 in which gas discharged from the battery cells 12 flows. The gas discharged from the battery cells 12 into the vent space 28 is discharged to the outside of the battery module 10 via exhaust holes 62 formed at end portions of the negative-electrode bus bar 25 and exhaust passages 64 (see FIG. 1) formed at end portions of the battery cell holder 14, and then is led to a proper position via ducts or the like.

Like the protective case 16, the vent cover 20 is also joined to the battery cell holder 14. This joining manner is also not particularly limited as long as the vent cover 20 can move together with the battery cell holder 14 when the battery module 10 is subjected to vibration or the like. In this embodiment, the vent cover 20 has joining portions 20a extending from the peripheral edge of the vent cover 20 toward the battery cell holder 14. The vent cover 20 is screwed to the battery cell holder 14 via joining holes provided to the joining portions 20a. Instead of screwing, however, the vent cover 20 may be joined to the battery cell holder 14 by another joining means such as fitting or welding. Since the peripheral edge of the negative-electrode bus bar 25 is sandwiched between the vent cover 20 and the battery cell holder 14, it can be said that the negative-electrode bus bar 25 is joined to the battery cell holder 14 via the vent cover 20.

The positive-electrode bus bar 23 electrically connecting the positive electrodes of the battery cells 12 to each other and the negative-electrode bus bar 25 electrically connecting the negative electrodes of the battery cells 12 to each other are disposed on both axial sides of the battery cells 12. The configurations of the positive-electrode bus bar 23 and the negative-electrode bus bar 25 are substantially the same. Therefore, hereinbelow, the configuration of the negative-electrode bus bar 25 will be mainly described with reference to FIG. 2.

The conductive plates 24 of the same number as that of the battery cell groups (four in this embodiment) are integrated with each other by a resin material 43, thereby forming the negative-electrode bus bar 25. The four conductive plates 24 are integrated with each other by the resin 43 (see FIG. 4) in a state where the conductive plates 24 are spaced apart from each other to maintain the insulation therebetween. The negative-electrode bus bar 25 is held with its peripheral edge sandwiched between the vent cover 20 and the battery cell holder 14.

Each conductive plate 24 electrically connects to each other the negative electrodes of the 15 battery cells 12 forming the single battery cell group. The conductive plate 24 is a flat plate member made of a conductive material such as copper. The conductive plate 24 is provided with through-openings 40 corresponding to the arranged battery cells 12. The through-openings 40 are provided in one-to-one correspondence with the individual battery cells 12 such that the lower end faces of the corresponding battery cells 12 are exposed to the vent space 28. The through-opening 40 has a diameter slightly smaller than the outer diameter of the battery cell 12. The discharge valve provided to the battery cell 12 is exposed to the vent space 28 via the through-opening 40. Gas discharged from the battery cell 12 passes through the through-opening 40 to reach the vent space 28.

The end face on the negative-electrode side of the battery cell 12 is supported by the peripheral edge (more precisely, the resin 43 covering the peripheral edge) of the through-opening 40. In other words, the battery cells 12 are held in the axial direction between the ceiling plate 30 of the protective case 16 and the negative-electrode bus bar 25. There is, however, a small tolerance for the size of the battery cells 12. In order to absorb this tolerance to securely hold the battery cells 12 between the ceiling plate 30 and the negative-electrode bus bar 25, an elastic member 68 is disposed between the end faces on the negative-electrode sides of the battery cells 12 and the negative-electrode bus bar 25 in this embodiment. The elastic member 68 has a suitable elasticity and is deformed as appropriate to absorb variation in the axial height of the battery cells 12. The elastic member 68 is disposed on the negative-electrode sides of the battery cells 12 in this embodiment, but may be disposed on the positive-electrode sides of the battery cells 12, i.e. between the end faces on the positive-electrode sides of the battery cells 12 and the ceiling plate 30. When the tolerance in the axial direction of the battery cells 12 is small, the elastic member 68 may be omitted.

A connecting piece 42 being a part of the conductive plate 24 is located in the through-opening 40. The connecting piece 42 is in the form of a plate spring having a suitable elasticity and is inclined to approach the negative electrode of the battery cell 12 as it approaches its tip. The tips of all the connecting pieces 42 are in contact with the negative electrodes of the corresponding battery cells 12, thereby electrically connecting the negative electrodes of the 15 battery cells 12 to each other.

The positive-electrode bus bar 23 including conductive plates of the same shapes as the conductive plates 24 is disposed above the battery cells 12. While the negative-electrode bus bar 25 by itself forms one component, the positive-electrode bus bar 23 is assembled into the protective case 16 and integrated with the protective case 16. Each conductive plate of the positive-electrode bus bar 23 electrically connects to each other the positive electrodes of the 15 battery cells 12 forming the single battery cell group. By the negative-electrode bus bar 25 and the positive-electrode bus bar 23, the 15 battery cells 12 forming each of the battery cell groups are connected in parallel to each other.

The four battery cell groups are connected in series to each other by the inter-group bus bars 26. Specifically, the inter-group bus bar 26 establishes electrical connection between the conductive plate, connected to one of the battery cell groups, of the positive-electrode bus bar 23 and the conductive plate 24, connected to the adjacent other battery cell group, of the negative-electrode bus bar 25. The inter-group bus bar 26 is a generally flat plate member made of a conductive material such as copper and, as shown in FIGS. 1 and 4, is disposed outside the protective case 16. The inter-group bus bar 26 has a generally parallelogram shape that goes in the X direction as it goes in the Z direction such that an upper end of the inter-group bus bar 26 is connected to the conductive plate, for one of the battery cell groups, of the positive-electrode bus bar 23, while its lower end is connected to the conductive plate 24, for the adjacent battery cell group, of the negative-electrode bus bar 25.

The support member 50 is provided between the negative-electrode bus bar 25 and the vent cover 20, i.e. in the vent space 28. The support member 50 is made of an insulating material such as a resin. In this embodiment, the support member 50 is integrated with the vent cover 20 by a resin. The support member 50 has a base portion 52 that adheres to an inner surface of the vent cover 20, and a plurality of columnar portions 54 standing upright from the base portion 52. The height of the columnar portion 54 is substantially equal to a distance from a surface of the base portion 52 to the negative-electrode bus bar 25. Therefore, the columnar portions 54 can be interposed between the negative-electrode bus bar 25 and the vent cover 20 to support the negative-electrode bus bar 25 from the lower side (the vent cover 20 side). In order not to impede the discharge of gas, the columnar portions 54 are provided at intervals. In other words, the support member 50 is provided only partially in the vent space 28.

Figure 5:
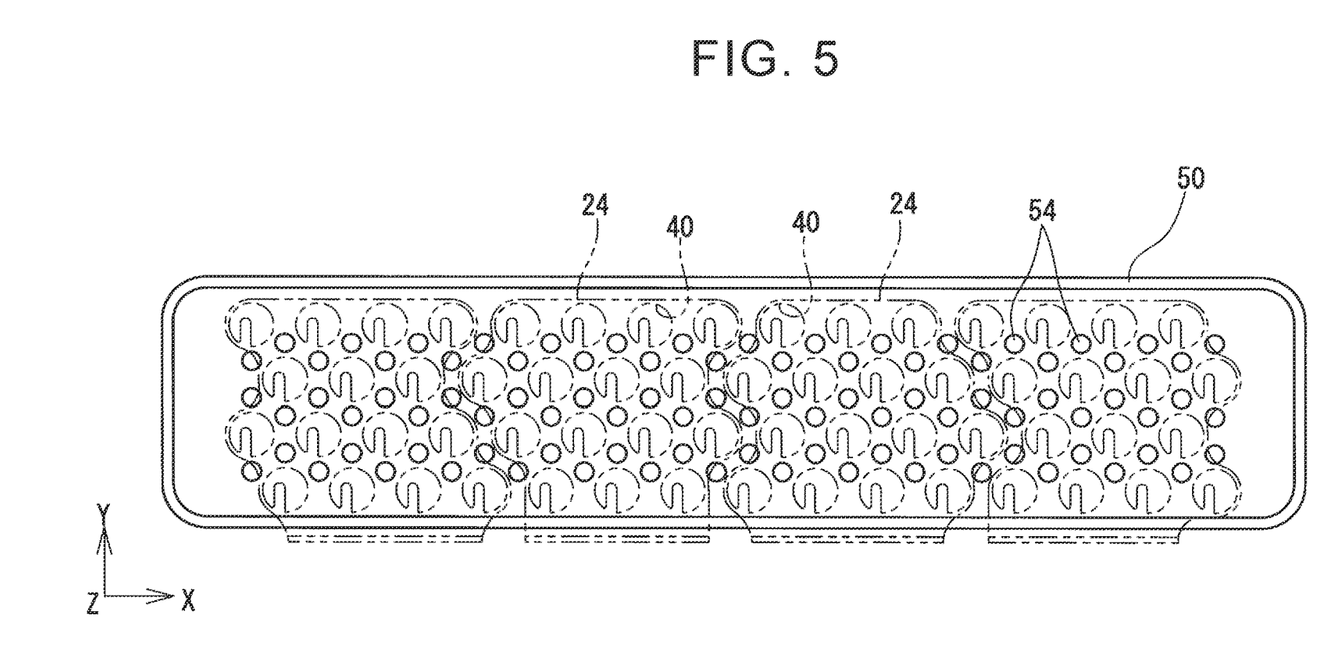
FIG. 5 is a schematic plan view of the support member.

As will be described later, the columnar portions 54 are provided for preventing the fall of the battery cells 12. Therefore, it is desirable that at least one columnar portion 54 be provided near each battery cell 12, preferably near the peripheral edge of each through-opening 40. FIG. 5 is a top view of the support member 50 of this embodiment. As described above, the conductive plates 24 of the negative-electrode bus bar 25 are each provided with the through-openings 40 at positions corresponding to the battery cells 12, and as is clear from FIG. 5, in this embodiment, at least one columnar portion 54 is provided between the adjacent two through-openings 40.

Next, the reason for providing the support member 50 in this embodiment will be described. When the support member 50 is not provided, the negative-electrode bus bar 25 supporting the battery cells 12 is supported only at its peripheral edge by the peripheral edge of the vent cover 20. There is no problem even with such a configuration when the adhesive 60 fixing the battery cells 12 to the receiving holes 15 of the battery cell holder 14 functions properly. However, when the adhesive 60 fixing the battery cells 12 is mechanically degraded due to vibration during travel of a vehicle or chemically degraded due to aging, there is a possibility that the battery cells 12 come off the receiving holes 15. Then, when the battery cells 12 come off the receiving holes 15, the load of the battery cells 12 is applied to the negative-electrode bus bar 25. In this case, there is a possibility that the negative-electrode bus bar 25 is bent or damaged due to the load of the battery cells 12. Then, when the negative-electrode bus bar 25 is bent or damaged, the battery cells 12 fall into the vent space 28, so that electrical connection to the positive-electrode bus bar 23 is lost. That is, when the support member 50 is not provided, there is a possibility that the battery cells 12 do not function normally even only with damage to one member, i.e. the adhesive 60 fixing the battery cells 12 to the receiving holes 15.

On the other hand, in this embodiment, as described above, the support member 50 supporting the negative-electrode bus bar 25 from the lower side (the vent cover side) is provided in the vent space 28. By providing the support member 50, even when the adhesive 60 is damaged to cause the battery cells 12 to come off the receiving holes 15, the fall of the battery cells 12 can be prevented. That is, even when the battery cells 12 come off the receiving holes 15 to apply the load thereof to the negative-electrode bus bar 25, the negative-electrode bus bar 25 is supported by the support member 50. Therefore, bending or the like of the negative-electrode bus bar 25 is effectively prevented. As a result, it is possible to continuously maintain the state where the battery cells 12 are held between the negative-electrode bus bar 25 and the ceiling plate 30 of the protective case 16. By maintaining this state, it is possible to maintain the state where the battery cells 12 are connected to the positive-electrode bus bar 23 and to the negative-electrode bus bar 25, so that the performance of the battery module 10 can be properly maintained. In this way, according to this embodiment, since the performance of the battery module 10 can be maintained even when a partial component (the adhesive 60) is damaged, it is possible to further improve the reliability of the battery module 10.

The negative-electrode bus bar 25 is supported by the support member 50, while the support member 50 is supported by the vent cover 20. The vent cover 20 is joined to the battery cell holder 14 as described above. Further, the protective case 16 integrated with the positive-electrode bus bar 23 is also joined to the battery cell holder 14. Therefore, when the battery module 10 is subjected to vibration, the negative-electrode bus bar 25 and the protective case 16 (the positive-electrode bus bar 23) can move together with the battery cell holder 14. As a result, when the battery module 10 is subjected to vibration, the negative-electrode bus bar 25 and the positive-electrode bus bar 23 move in the same phase. Consequently, the load to the conducting portions (the tips of the connecting pieces 42) of the negative-electrode bus bar 25 and the positive-electrode bus bar 23 during vibration can be effectively reduced, so that it is possible to effectively prevent degradation of the positive-electrode/negative-electrode bus bars 23 and 25.

In this embodiment, the support member 50 is integrated with the vent cover 20 by the resin material. Therefore, it is possible to reduce the number of components of the battery module 10 and thus to reduce the number of assembly steps of the battery module 10. The support member 50 may be integrated with the negative-electrode bus bar 25, not with the vent cover 20, by the resin material. In this embodiment, the negative-electrode bus bar 25 is supported by the columnar portions 54 arranged at intervals. With this configuration, compared to a case where the negative-electrode bus bar 25 is supported by linear ribs or the like, the vent flow is less hindered and further it is easy to uniformly distribute support points of the negative-electrode bus bar 25. As a result, bending of the negative-electrode bus bar 25 is effectively prevented, so that the movement of the battery cells 12 in the axial direction is effectively prevented.

Figure 6:
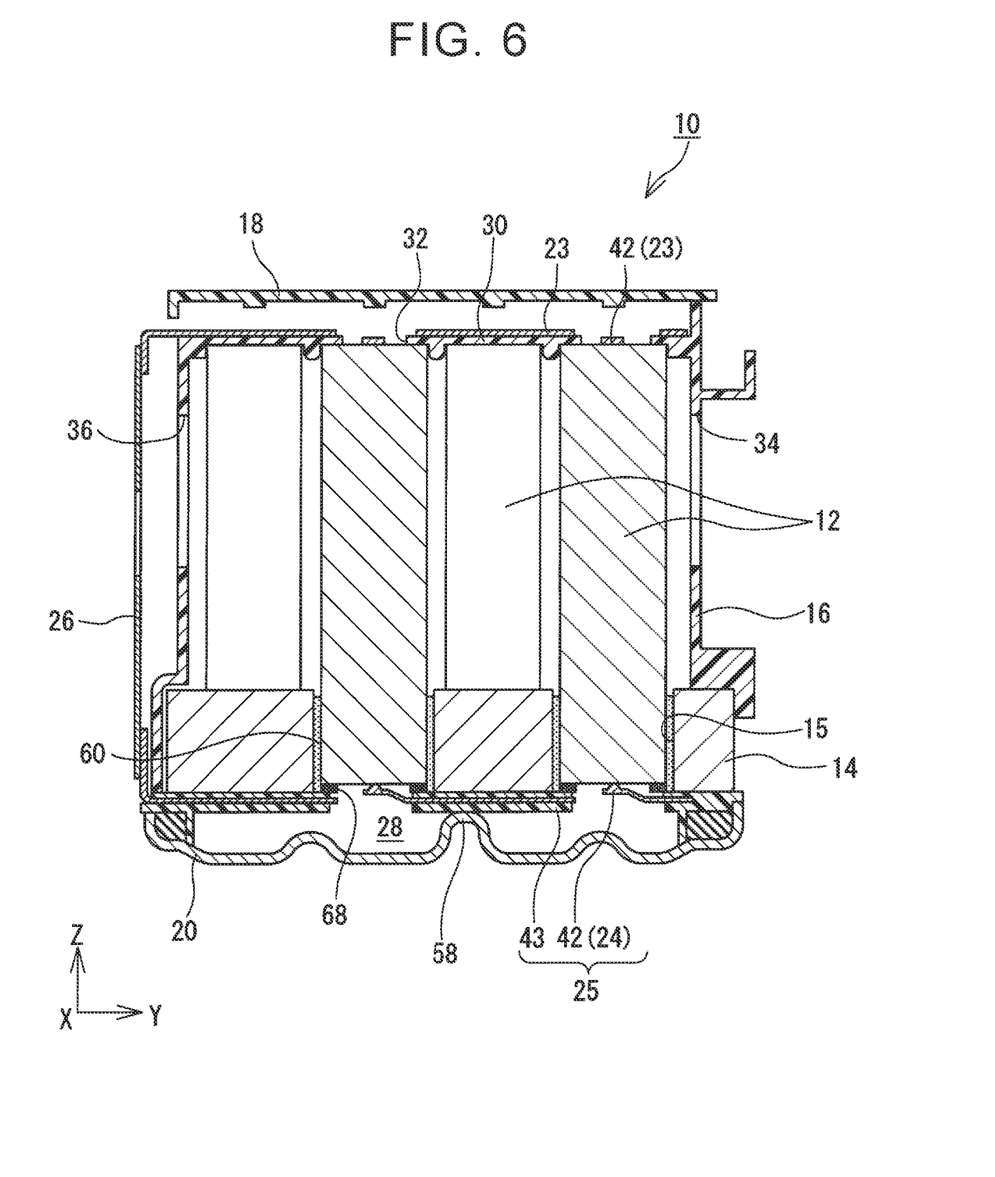
FIG. 6 is a sectional view in the YZ plane of a battery module according to a second embodiment of the disclosure.
Figure 7:
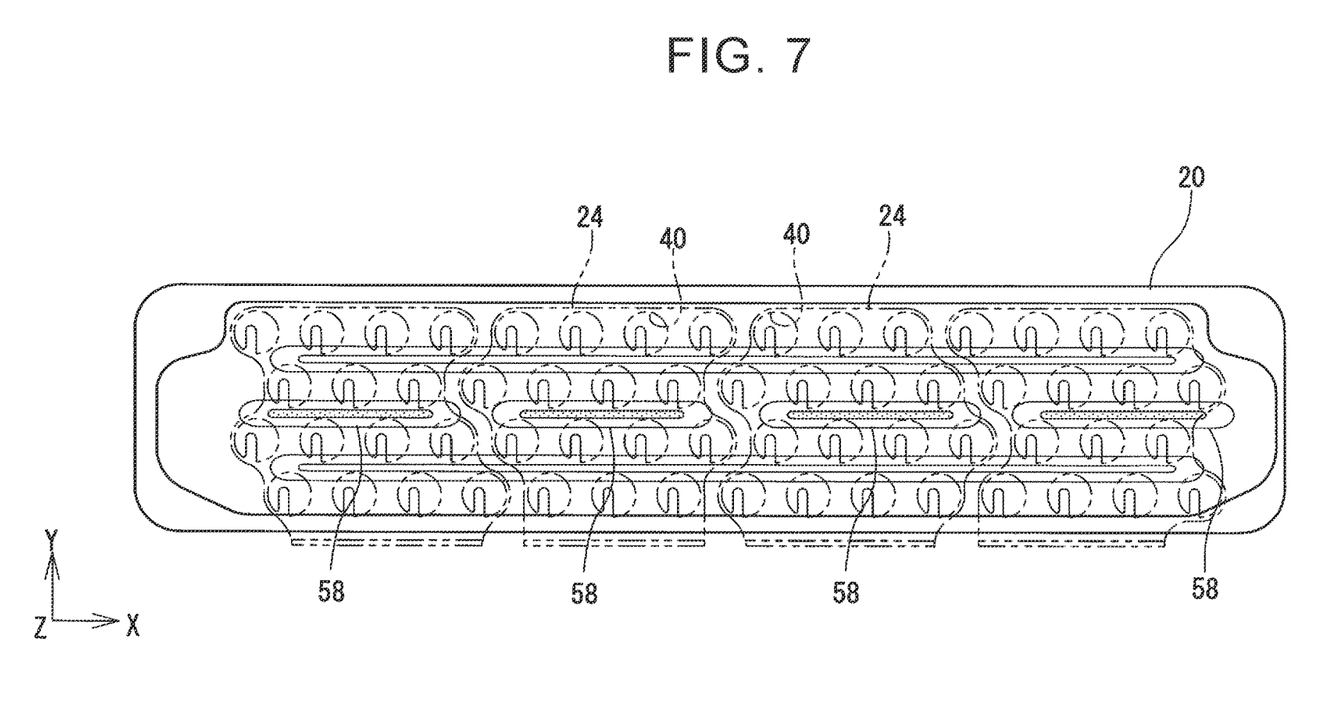
FIG. 7 is a schematic plan view of a support member of the battery module of the second embodiment.

Next, another embodiment will be described. FIG. 6 is a sectional view in the YZ plane of a battery module 10, and FIG. 7 is a schematic plan view of a vent cover 20. In FIG. 7, sand-hatched portions each indicate a contact portion between a protruding portion 58 and a negative-electrode bus bar 25.

In the battery module 10, portions of the vent cover 20 are used as support members instead of the support member 50 having the columnar portions 54. That is, the vent cover 20 of this embodiment is provided at portions of its bottom surface with the protruding portions 58 protruding to the negative-electrode bus bar 25 side and supporting the negative-electrode bus bar 25 from the lower side. The protruding portion 58 has a bead shape protruding in an arc and is formed, for example, by pressing a metal plate constituting the vent cover 20. In this case, the vent cover 20 is contiguous with the negative-electrode bus bar 25. In order to reliably ensure insulation from the negative-electrode bus bar 25, insulation treatment is applied to a surface of the vent cover 20. While the manner of the insulation treatment is not particularly limited, it is possible to employ, for example, a treatment method for cation painting of insulating paint.

As shown in FIG. 7, the protruding portion 58 is disposed between two through-openings 40 adjacent to each other in the Y direction and has a generally linear shape extending in the X direction. The reason for shaping the protruding portion 58 so as to extend in the X direction is that gas from battery cells 12 is discharged to the outside from X-direction end portions of the battery module 10. That is, in the battery module 10 of this embodiment, gas discharged into a vent space 28 is discharged to the outside via exhaust holes 62 provided at X-direction end portions of the negative-electrode bus bar 25 and exhaust passages 64 provided at X-direction end portions of a battery cell holder 14. Therefore, it is satisfactory if the gas discharged into the vent space 28 can move to X-direction end portions of the vent space 28, and thus, even if the movement of the gas in the Y direction is limited to some extent, no serious problem arises. Therefore, in this embodiment, the protruding portion 58 is formed into the linear shape extending in the X direction. Consequently, while properly supporting peripheral portions of the through-openings 40 of the negative-electrode bus bar 25, proper venting is made possible.

As is clear from the description given above, in this embodiment, the support member 50 as a separate member from the vent cover 20 is eliminated, and the portions (the protruding portions 58) of the vent cover 20 are used as the support members. As a result, it is possible to further reduce the number of components of the battery module 10 and thus to reduce the number of assembly steps and so on. Also in this embodiment, like in the first embodiment, even when an adhesive 60 fixing the battery cells 12 is damaged or the like, it is possible to continuously hold the battery cells 12 between the negative-electrode bus bar 25 and a ceiling plate 30 of a protective case 16, so that the movement of the battery cells 12 in the axial direction is effectively prevented, resulting in that it is possible to continuously maintain electrical connection of the battery cells 12. In this way, according to this embodiment, since the performance of the battery module 10 can be maintained even when a partial component (the adhesive 60) is damaged, it is possible to further improve the reliability of the battery module 10.

The configurations described above are only by way of example. As long as the support member 50 supporting the bus bar is provided in the configuration in which the battery cells 12 are held between part of the protective case 16 and part of the bus bar, the other configurations may be changed as appropriate. For example, the battery module 10 of each of the first and second embodiments is disposed such that the axial direction of the battery cells 12 is substantially parallel to the vertical direction. However, the disposition posture of the battery module 10 may be changed as appropriate, and, for example, the battery module 10 may be disposed such that the axial direction of the battery cells 12 is substantially parallel to the horizontal direction. Even in this case, as long as the battery cells 12 are held between part of the protective case 16 and part of the bus bar and further the bus bar is supported by the support member 50, the movement of the battery cells 12 in the axial direction is effectively prevented, so that electrical connection of the battery cells 12 is maintained. Further, in the description given above, the battery cells 12 are disposed in the posture in which the positive electrodes are located on the ceiling plate 30 (the protective case 16) side and the negative electrodes are located on the vent cover 20 side, but this may be reversed. That is, in the example of FIG. 1, the battery cells 12 may be disposed in a posture in which the positive electrodes face downward, while the negative electrodes face upward. The positive-electrode bus bar 23 is preferably integrated with the protective case 16, but may be separated from the protective case 16. When the positive-electrode bus bar 23 is separated from the protective case 16, it is desirable that the positive-electrode bus bar 23 be joined to the protective case 16 by some means so as to move in the same phase with the protective case 16. Further, the numbers of the battery cells 12 and the battery cell groups forming the battery module 10 may be changed as appropriate.

What is claimed is:

1. An in-vehicle battery module comprising:
a plurality of cylindrical battery cells, each of the plurality of cylindrical battery cells including a first electrode and a second electrode at both axial ends of the cylindrical battery;
a battery cell holder configured to hold the plurality of cylindrical battery cells in a state where the first electrodes and the second electrodes are exposed to outside;
a protective case configured to urge end faces on first-electrode sides of the plurality of cylindrical battery cells toward second-electrode sides of the plurality of cylindrical battery cells;
a vent cover provided such that the battery cell holder is positioned between the protective case and the vent cover, the vent cover and the battery cell holder disposed such that a vent space, in which gas discharged from an end face on the second-electrode side of the cylindrical battery cell flows, is provided between the vent cover and the battery cell holder;
at least one first-electrode bus bar being in contact with the first electrodes of the plurality of cylindrical battery cells such that at least two of the cylindrical battery cells are connected in parallel to each other,
at least one second-electrode bus bar provided in the vent space and the at least one second-electrode bus bar being in contact with the second electrodes of the plurality of cylindrical battery cells such that at least two of the cylindrical battery cells are connected in parallel to each other, wherein the at least one second-electrode bus bar includes through-openings provided for each of the cylindrical battery cells; and
a support member on the vent cover so as to be disposed partially in the vent space, the support member including a base portion on the vent cover and a plurality of columnar portions extending from the base portion toward the battery cell holder, and disposed, at intervals, so as to support the second-electrode bus bar, and
a peripheral edge of each of the through-openings has at least one of the plurality of columnar portions disposed adjacently thereto.

2. The in-vehicle battery module according to claim 1, further comprising
an elastic member disposed at least one of between the end faces on the first-electrode sides of the cylindrical battery cells and the protective case and between the end faces on the second-electrode sides of the cylindrical battery cells and the second-electrode bus bar such that the elastic member elastically deforms to absorb an axial height tolerance of the cylindrical battery cells.

3. The in-vehicle battery module according to claim 1, wherein
the first-electrode bus bar is joined to the battery cell holder via the protective case, and
the second-electrode bus bar is joined to the battery cell holder via the vent cover.

4. The in-vehicle battery module according to claim 1, wherein the protruding portions have a linear shape extending in a longitudinal direction of the battery module as viewed in plan view of the vent cover.

5. An in-vehicle battery module comprising:
a plurality of cylindrical battery cells, each of the plurality of cylindrical battery cells including a first electrode and a second electrode at both axial ends of the cylindrical battery;
a battery cell holder configured to hold the plurality of cylindrical battery cells in a state where the first electrodes and the second electrodes are exposed to outside;
a protective case configured to urge end faces on first-electrode sides of the plurality of cylindrical battery cells toward second-electrode sides of the plurality of cylindrical battery cells;
a vent cover provided such that the battery cell holder is positioned between the protective case and the vent cover, the vent cover and the battery cell holder disposed such that a vent space, in which gas discharged from an end face on the second-electrode side of the cylindrical battery cell flows, is provided between the vent cover and the battery cell holder;
at least one first-electrode bus bar being in contact with the first electrodes of the plurality of cylindrical battery cells such that at least two of the cylindrical battery cells are connected in parallel to each other; and
at least one second-electrode bus bar provided in the vent space and the at least one second-electrode bus bar being in contact with the second electrodes of the plurality of cylindrical battery cells such that at least two of the cylindrical battery cells are connected in parallel to each other, wherein the at least one second-electrode bus bar includes through-openings provided for each of the cylindrical battery cells,
wherein:
the vent cover includes protruding portions that protrude from the vent cover toward the at least one second-electrode bus bar so as to support a side of the second-electrode bus bar that faces the vent space,
the protruding portions are disposed at intervals and between an adjacent two of the through-openings,
insulation treatment is applied to a surface of the vent cover,
a part of the vent cover subjected to the insulation treatment includes the protruding portions.

* * * * *